(12) United States Patent
Ma et al.

(10) Patent No.: US 12,120,251 B2
(45) Date of Patent: Oct. 15, 2024

(54) SYSTEM, METHOD AND APPARATUS FOR DEVELOPING SMART CONTRACT

(71) Applicant: Jingdong Technology Information Technology Co., Ltd., Beijing (CN)

(72) Inventors: Chao Ma, Beijing (CN); Ming Zhao, Beijing (CN); Chunwei Liu, Beijing (CN); Yi Wang, Beijing (CN); Qun Lin, Beijing (CN); Haibo Sun, Beijing (CN)

(73) Assignee: JINGDONG TECHNOLOGY INFORMATION TECHNOLOGY CO., LTD., Beijing (CN)

( * ) Notice: Subject to any disclaimer, the term of this patent is extended or adjusted under 35 U.S.C. 154(b) by 223 days.

(21) Appl. No.: 17/637,907

(22) PCT Filed: Apr. 1, 2020

(86) PCT No.: PCT/CN2020/082672
§ 371 (c)(1),
(2) Date: Feb. 24, 2022

(87) PCT Pub. No.: WO2021/042715
PCT Pub. Date: Mar. 11, 2021

(65) Prior Publication Data
US 2022/0278860 A1    Sep. 1, 2022

(30) Foreign Application Priority Data
Sep. 4, 2019 (CN) .......................... 201910832970.0

(51) Int. Cl.
*H04L 9/00* (2022.01)
*G06F 11/36* (2006.01)
*G06F 40/186* (2020.01)

(52) U.S. Cl.
CPC ............ *H04L 9/50* (2022.05); *G06F 11/3684* (2013.01); *G06F 40/186* (2020.01)

(58) Field of Classification Search
CPC . H04L 9/40; H04L 9/50; G06F 40/186; G06F 11/3684; G06Q 20/389; G06Q 20/401
See application file for complete search history.

(56) References Cited

U.S. PATENT DOCUMENTS 10,476,847 B1 *  11/2019  Smith ................... H04L 63/102
10,528,551 B2 *   1/2020  Li ......................... H04L 9/0637
(Continued)

FOREIGN PATENT DOCUMENTS

CN        107943950 A       4/2018
CN        108052321 A       5/2018
(Continued)

OTHER PUBLICATIONS

Abdellatif et al., "Formal verification of smart contracts based on users and blockchain behaviors models", IFIP NTMS International Workshop on Blockchains and Smart Contracts (BSC), Feb. 2018, 6 pages.
(Continued)

*Primary Examiner* — Hosuk Song
(74) *Attorney, Agent, or Firm* — Buchanan Ingersoll & Rooney PC

(57) ABSTRACT

A system, a method and a device for developing a smart contract are provided. A particular embodiment of the system comprises a specification acquisition module configured to acquire specification of a target smart contract interface, a client development module configured to generate, on the basis of the specification of the target smart contract interface, a smart contract client side interface and a smart contract client side agent, the smart contract client side interface and the smart contract client side agent being used
(Continued)

to construct a client smart contract application, and a server development module configured to generate, on the basis of the interface specification of the target smart contract, a smart contract server interface and a smart contract server skeleton, the smart contract server interface and the smart contract server skeleton being used to construct a server smart contract.

8 Claims, 6 Drawing Sheets

(56) References Cited

U.S. PATENT DOCUMENTS

| | | | | |
|---|---|---|---|---|
| 10,692,054 | B2* | 6/2020 | Chow | G06Q 10/1097 |
| 10,762,079 | B2* | 9/2020 | Shi | H04L 63/08 |
| 11,169,985 | B2* | 11/2021 | Innocenti | G06F 16/219 |
| 11,182,379 | B2* | 11/2021 | Yang | H04L 9/50 |
| 11,822,538 | B2* | 11/2023 | Yang | G06F 16/27 |
| 2005/0278693 | A1 | 12/2005 | Brunell et al. | |
| 2015/0379510 | A1 | 12/2015 | Smith | |
| 2019/0102423 | A1 | 4/2019 | Little et al. | |

FOREIGN PATENT DOCUMENTS

| | | |
|---|---|---|
| CN | 108763058 A | 11/2018 |
| CN | 109542421 A | 3/2019 |
| CN | 109614093 A | 4/2019 |
| CN | 109615518 A | 4/2019 |
| CN | 109683867 A | 4/2019 |
| CN | 109683869 A | 4/2019 |
| CN | 110532115 A | 12/2019 |
| JP | 2000181716 A | 6/2000 |
| WO | 2019082100 A1 | 5/2019 |
| WO | 2019101236 A2 | 5/2019 |

OTHER PUBLICATIONS

Bragognola et al., "Smartinspect: solidity smart contract inspector", Conference Paper, 2018, https:/www.researchgate.net/publication/324100841, 11 pages.
Chinese Office Action for Chinese Application No. 201910832970.0, dated Sep. 27, 2020, 10 pages.
International Search Report and Written Opinion for International Application No. PCT/CN2020/082672, dated Jul. 6, 2020, 6 pages.
Kai et al., "Formal Verification Method of Smart Contract", Journal of Information Security Research, vol. 2, No. 12, Dec. 2016, 10 pages. Abstract Only.

\* cited by examiner

SYSTEM, METHOD AND APPARATUS FOR DEVELOPING SMART CONTRACT

CROSS-REFERENCE TO RELATED APPLICATIONS

This patent application is a national stage of International Application No. PCT/CN2020/082672, filed on Apr. 1, 2020, which claims the priority from Chinese Patent Application No. 201910832970.0, filed on Sep. 4, 2019, entitled "System, Method and Apparatus for Developing Smart Contract". Both of the aforementioned applications are hereby incorporated by reference in their entireties.

TECHNICAL FIELD

Embodiments of the present disclosure relate to the field of computer technology, and particularly to a system, method and apparatus for developing a smart contract.

BACKGROUND

Blockchain is a distributed accounting mechanism produced based on computer technologies such as a distributed data storage, a point-to-point transmission, a consensus mechanism and an encryption algorithm. A smart contract in the blockchain technology is a software program that runs on a blockchain platform and is interpreted and executed by a smart contract virtual machine. In practice, one smart contract may be understood as one set of commitments defined in a digital form, and include an agreement on which a contract participant may perform these commitments.

At present, the smart contract development interface of the blockchain platform is usually a process programming paradigm.

SUMMARY

Embodiments of the present disclosure propose a system, method and apparatus for developing a smart contract.

According to a first aspect, some embodiments of the present disclosure provide a system for developing a smart contract. The system includes: a specification acquiring module, configured to acquire specification of a target smart contract interface, the specification of the target smart contract interface being used to define the target smart contract interface; a client-side developing module, configured to generate a smart contract client-side interface and a smart contract client-side agent according to the specification of the target smart contract interface, where the smart contract client-side interface is client-side definition information used to define the target smart contract interface, the smart contract client-side agent is used to implement the smart contract client-side interface, and the smart contract client-side interface and the smart contract client-side agent are used to build a client-side smart contract application; and a server-side developing module, configured to generate a smart contract server-side interface and a smart contract server-side skeleton according to the specification of the target smart contract interface, where the smart contract server-side interface is server-side definition information used to define the target smart contract interface, the smart contract server-side skeleton is used to establish a relation between the smart contract client-side interface and the smart contract server-side interface, and the smart contract server-side interface and the smart contract server-side skeleton are used to build a server-side smart contract.

In some embodiments, the specification acquiring module is further configured to: acquire the specification of the target smart contract interface of the target smart contract interface using a predetermined smart contract interface specification template.

In some embodiments, the client-side definition information and the server-side definition information comprise information used to characterize an association relationship between the target smart contract interface and a target blockchain.

In some embodiments, the system further includes: a testing module, configured to test the built client-side smart contract application and the built server-side smart contract using a target test case, the target test case being generated based on the smart contract client-side interface and the smart contract client-side agent.

According to a second aspect, some embodiments of the present disclosure provide a method for developing a client-side smart contract application. The method includes: acquiring specification of a target smart contract interface sent from a specification acquiring module, the specification of the target smart contract interface being used to define the target smart contract interface; and generating a smart contract client-side interface and a smart contract client-side agent according to the specification of the target smart contract interface, where the smart contract client-side interface is client-side definition information used to define the target smart contract interface, the smart contract client-side agent is used to implement the smart contract client-side interface, and the smart contract client-side interface and the smart contract client-side agent are used to build a client-side smart contract application.

In some embodiments, the client-side definition information comprises information used to characterize an association relationship between the target smart contract interface and a target blockchain.

According to a third aspect, some embodiments of the present disclosure provide a method for developing a server-side smart contract. The method includes: acquiring specification of a target smart contract interface sent from a specification acquiring module, the specification of the target smart contract interface being used to define the target smart contract interface; and generating a smart contract server-side interface and a smart contract server-side skeleton according to the specification of the target smart contract interface, where the smart contract server-side interface is server-side definition information used to define the target smart contract interface, the smart contract server-side skeleton is used to establish a relation between a smart contract client-side interface and the smart contract server-side interface, and the smart contract server-side interface and the smart contract server-side skeleton are used to build a server-side smart contract.

In some embodiments, the server-side definition information comprises information used to characterize an association relationship between the target smart contract interface and a target blockchain.

According to a fourth aspect, some embodiments of the present disclosure provide an apparatus for developing a client-side smart contract application. The apparatus includes: a first acquiring unit, configured to acquire specification of a target smart contract interface sent from a specification acquiring module, the specification of the target smart contract interface being used to define the target smart contract interface; and a first generating unit, configured to generate a smart contract client-side interface and a smart contract client-side agent according to the specification of the target smart contract interface, where the smart contract client-side interface is client-side definition information used to define the target smart contract interface, the smart contract client-side agent is used to implement the smart contract client-side interface, and the smart contract client-side interface and the smart contract client-side agent are used to build a client-side smart contract application.

According to a fifth aspect, some embodiments of the present disclosure provide an apparatus for developing a server-side smart contract. The apparatus includes: a second acquiring unit, configured to acquire specification of a target smart contract interface sent from a specification acquiring module, the specification of the target smart contract interface being used to define the target smart contract interface; and a second generating unit, configured to generate a smart contract server-side interface and a smart contract server-side skeleton according to the specification of the target smart contract interface, where the smart contract server-side interface is server-side definition information used to define the target smart contract interface, the smart contract server-side skeleton is used to establish a relation between a smart contract client-side interface and the smart contract server-side interface, and the smart contract server-side interface and the smart contract server-side skeleton are used to build a server-side smart contract.

According to a sixth aspect, some embodiments of the present disclosure provide an electronic device. The device includes: one or more processors; and a storage apparatus, configured to store one or more programs, where the one or more programs, when executed by the one or more processors, cause the one or more processors to implement the method according to any one of the embodiments in the second and third aspect.

According to a seventh aspect, some embodiments of the present disclosure provide a computer readable medium, storing a computer program, where the program, when executed by a processor, causes the method according to any one of the embodiments in the second and third aspect to be implemented.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

Embodiments of the present disclosure is further described below in detail by combining the accompanying drawings. It may be appreciated that the detailed embodiments described herein are merely used for explaining the relevant invention, rather than limiting the invention. In addition, it should also be noted that, for the ease of description, only the parts related to the relevant invention are shown in the accompanying drawings.

It should be noted that embodiments in the present disclosure and the features in the embodiments may be combined with each other on a non-conflict basis. Embodiments of the present disclosure will be described below in detail with reference to the accompanying drawings.

Figure 1:
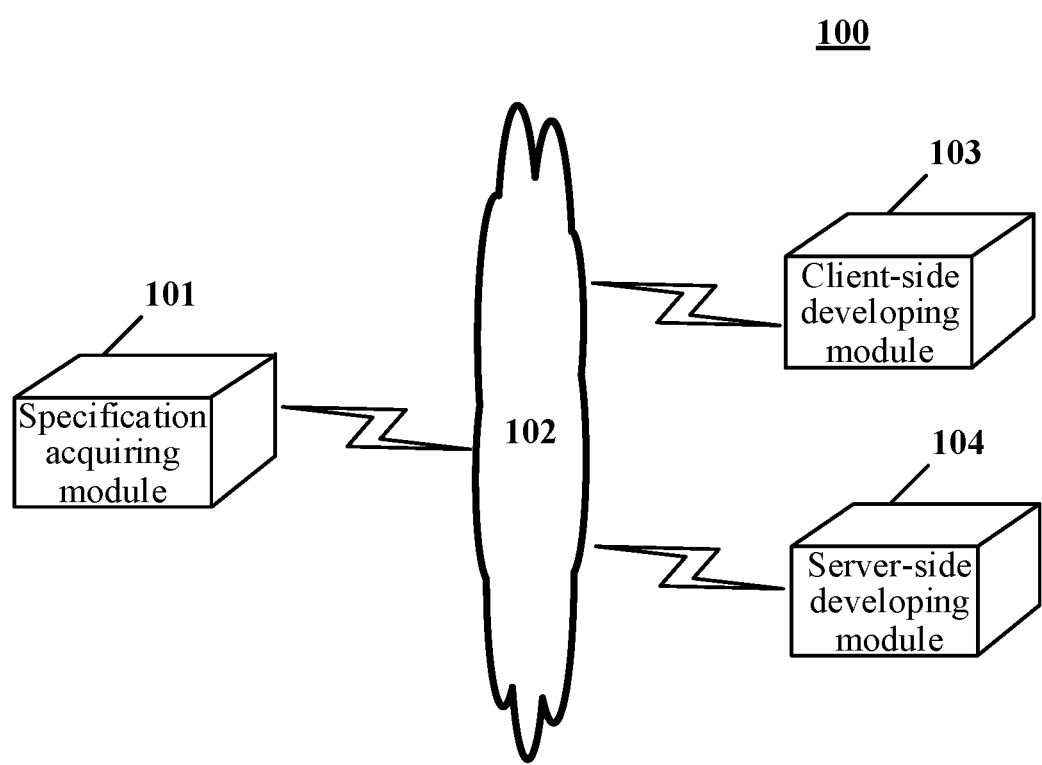
FIG. 1 is a diagram of an exemplary system architecture in which the present disclosure may be applied.

FIG. 1 illustrates an exemplary system architecture 100 in which a system for developing a smart contract, a method for developing a client-side smart contract application, a method for developing a server-side smart contract, an apparatus for developing a client-side smart contract application or an apparatus for developing a server-side smart contract according to embodiments of the present disclosure may be applied.

As shown in FIG. 1, the system architecture 100 may include a specification acquiring module 101, a network 102, a client-side developing module 103 and a server-side developing module 104. The network 102 serves as a medium providing a communication link between the specification acquiring module 101 and the client-side developing module 103 and between the specification acquiring module 101 and the server-side developing module 104. The network 102 may include various types of connections, for example, wired or wireless communication links, or optical fiber cables.

A client-side developer may use the client-side developing module 103 to interact with the specification acquiring module 101 via the network 102, to receive specification of a smart contract interface sent by the specification acquiring module 101. Similarly, a server-side developer may use the server-side developing module 104 to interact with the specification acquiring module 101 via the network 102, to receive specification of a smart contract interface sent by the specification acquiring module 101.

The specification acquiring module 101 may be hardware or software. When being the hardware, the specification acquiring module 101 may be various electronic devices having a function of acquiring specification of a smart contract interface, the electronic devices including, but not limited to, a smartphone, a tablet computer, a laptop portable computer, a desktop computer, etc. When being the software, the specification acquiring module 101 may be installed in the above listed electronic devices. The specification acquiring module may be implemented as a plurality of pieces of software or a plurality of software modules (e.g., software or software modules for providing a distributed service), or as a single piece of software or a single software module, which will not be specifically limited here.

The client-side developing module 103 may be hardware or software. When being the hardware, the client-side developing module 103 may be various electronic devices having a function of developing software, the electronic devices including, but not limited to, a laptop portable computer, a desktop computer, etc. When being the software, the client-side developing module 103 may be installed in the above listed electronic devices. The client-side developing module may be implemented as a plurality of pieces of software or a plurality of software modules (e.g., software or software modules for providing a distributed service), or as a single piece of software or a single software module, which will not be specifically limited here.

Similarly, the server-side developing module 104 may be hardware or software. When being the hardware, the server-side developing module 104 may be various electronic devices having a function of developing software, the electronic devices including, but not limited to, a laptop portable computer, a desktop computer, etc. When being the software, the server-side developing module 104 may be installed in the above listed electronic devices. The server-side developing module may be implemented as a plurality of pieces of software or a plurality of software modules (e.g., software or software modules for providing a distributed service), or as a single piece of software or a single software module, which will not be specifically limited here.

In particular, when the specification acquiring module 101, the client-side developing module 103 and the server-side developing module 104 all are software, the three may be installed in the same electronic device (e.g., the same laptop portable computer or the same desktop computer).

It should be noted that the method for developing a client-side smart contract application provided by embodiments of the present disclosure is generally performed by the client-side developing module 103, and correspondingly, the apparatus for developing a client-side smart contract application is generally provided in the client-side developing module 103. The method for developing a server-side smart contract provided by embodiments of the present disclosure is generally performed by the server-side developing module 104, and correspondingly, the apparatus for developing a server-side smart contract is generally provided in the server-side developing module 104.

It should be appreciated that the numbers of the specification acquiring modules, the networks, the client-side developing modules and the server-side developing modules in FIG. 1 are merely illustrative. Any number of specification acquiring modules, networks, client-side developing modules and server-side developing modules may be provided based on actual requirements.

Figure 2:
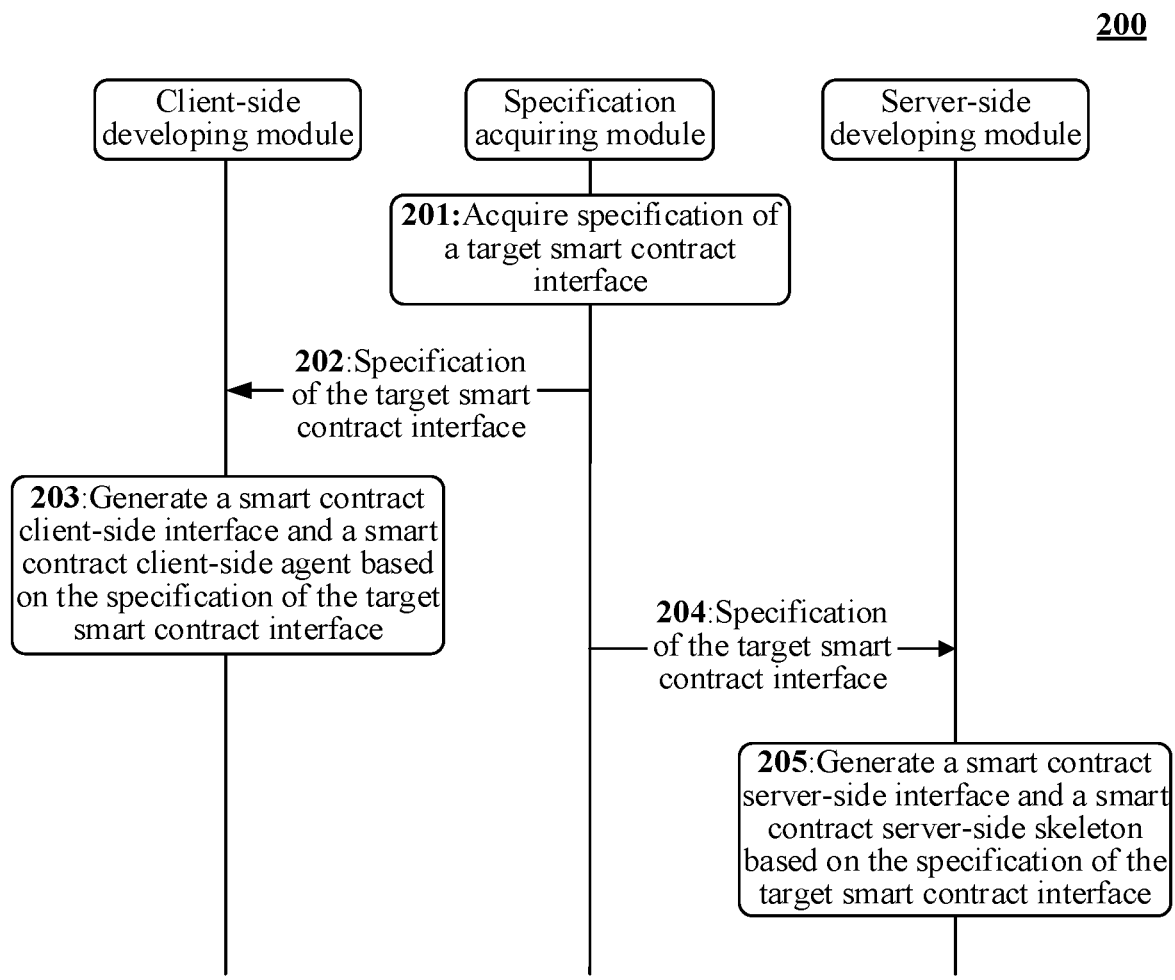
FIG. 2 is a timing diagram of an embodiment of a system for developing a smart contract according to an embodiment of the present disclosure.

Referring to FIG. 2, FIG. 2 is a timing diagram 200 of an embodiment of a system for developing a smart contract according to an embodiment of the present disclosure.

The system for developing a smart contract in the embodiment of the present disclosure may include: a specification acquiring module, configured to acquire specification of a target smart contract interface, the specification of the target smart contract interface being used to define the target smart contract interface; and a client-side developing module, configured to generate a smart contract client-side interface and a smart contract client-side agent based on the specification of the target smart contract interface. Here, the smart contract client-side interface is client-side definition information used to define the target smart contract interface, the smart contract client-side agent is used to implement the smart contract client-side interface, and the smart contract client-side interface and the smart contract client-side agent are used to build a client-side smart contract application. The system for developing a smart contract may further include: a server-side developing module, configured to generate a smart contract server-side interface and a smart contract server-side skeleton based on the specification of the target smart contract interface. Here, the smart contract server-side interface is server-side definition information used to define the target smart contract interface, and the smart contract server-side skeleton is used to establish a relation between the smart contract client-side interface and the smart contract server-side interface. The smart contract server-side interface and the smart contract server-side skeleton are used to build a server-side smart contract.

As shown in FIG. 2, in step 201, the specification acquiring module acquires specification of a target smart contract interface.

In this embodiment, the specification acquiring module (e.g., the specification acquiring module 101 shown in FIG. 1) may locally or remotely acquire the specification of the target smart contract interface by means of a wired connection or a wireless connection. Here, the specification of the target smart contract interface is used to define the target smart contract interface. The target smart contract interface may be an interface of a to-be-developed smart contract, is used to implement the interaction between the to-be-developed smart contract and a node in a target blockchain. The target blockchain may be a blockchain to which the to-be-developed smart contract belongs.

Particularly, as an example, the specification of the target smart contract interface may include information used to define an interface method, interface data, etc. of the target smart contract interface. For example, the target smart contract interface is a fund deposit and management interface. The specification of the target smart contract interface may include information used to define account opening and account transferring these two interface methods, and may further include information used to define the interface data such as user name and password.

In practice, the information used to define the target smart contract interface and included in the specification of the target smart contract interface may be information determined by a developer. Further, the specification acquiring module may acquire the specification of the target smart contract interface based on the information determined by the developer.

In some alternative implementations of this embodiment, the specification acquiring module may be further configured to: acquire the specification of the target smart contract interface of the target smart contract interface using a predetermined smart contract interface specification template. Here, the smart contract interface specification template may be a predetermined template used to acquire specification of a smart contract interface. The developer may enter the information used to define the target smart contract interface into the smart contract interface specification template, and thus to obtain the specification of the target smart contract interface. As an example, the smart contract interface template may include interface method items, and the developer may enter the account opening and the account transferring at the positions of the interface method items. Thus, the specification of the target smart contract interface is obtained based on the information used to define the interface methods of the target smart contract interface and entered by the developer.

In this implementation, the use of the smart contract interface specification template may simplify the step of acquiring the specification of the target smart contract interface, which is conducive to improving the efficiency of the development for the smart contract.

In step 202, the specification acquiring module sends the specification of the target smart contract interface to the client-side developing module.

In this embodiment, based on the specification of the target smart contract interface obtained in step 201, the specification acquiring module may send the above specification of the target smart contract interface to the client-side developing module (e.g., the client-side developing module 103 shown in FIG. 1).

In step 203, the client-side developing module generates a smart contract client-side interface and a smart contract client-side agent based on the specification of the target smart contract interface.

In this embodiment, the client-side developing module may generate a smart contract client-side interface and a smart contract client-side agent based on the specification of the target smart contract interface. Here, the smart contract client-side interface may be the client-side definition information used to define the target smart contract interface. Particularly, the client-side definition information may include information defining the target smart contract interface using a program language supported by a client side. The smart contract client-side agent may be used to implement the smart contract client-side interface. The smart contract client-side interface and the smart contract client-side agent may be used to build the client-side smart contract application.

In practice, the smart contract client-side interface and the smart contract client-side agent may be generated in various ways. Particularly, as an example, the client-side developing module may generate the smart contract client-side interface and the smart contract client-side agent using a predetermined smart contract client-side framework. Here, the smart contract client-side framework may be a predetermined framework, which may include basic functions for the client side to access the smart contract based on the interface. Particularly, the client-side developing module may convert, based on the smart contract client-side framework, the specification of the target smart contract interface into a language supported by the client side, thereby generating the smart contract client-side interface. On this basis, the client-side developing module may combine functions for implementing the smart contract client-side interface in the smart contract client-side framework, to obtain the smart contract client-side agent.

In some alternative implementations of this embodiment, the client-side definition information may further include information used to characterize an association relationship between the target smart contract interface and the target blockchain. Particularly, the association relationship between the target smart contract interface and the target blockchain may refer to an association relationship between a transaction produced through the target smart contract interface and the target blockchain. In practice, the developer may encapsulate a serial number of a block, to which the transaction corresponding to the target smart contract interface (i.e., the transaction produced through the target smart contract interface) belongs, in the target blockchain and the transaction confirmation time, etc. of the transaction into the smart contract client-side interface, and thus, the client-side definition information including the information used to characterize the association relationship between the target smart contract interface and the target blockchain is obtained.

In this implementation, the blockchain-related information of the target smart contract interface is extended in the smart contract client-side interface, which is conducive to developing a more comprehensive client-side smart contract application. In addition, in the process of generating the smart contract client-side interface, the blockchain-related information is encapsulated, and thus, the subsequent process of developing the client-side smart contract application based on the smart contract client-side interface can be simplified, thereby improving the efficiency of the development for the client-side smart contract application.

In practice, the developer may build the client-side smart contract application based on the generated smart contract client-side interface and the generated smart contract client-side agent.

In step 204, the specification acquiring module sends the specification of the target smart contract interface to the server-side developing module.

In this embodiment, based on the specification of the target smart contract interface obtained in step 201, the specification acquiring module may send the above specification of the target smart contract interface to the server-side developing module (e.g., the server-side developing module 104 shown in FIG. 1).

It should be noted that step 204 may be performed in synchronization with the above step 202, or may be performed before or after step 202 is performed. The order in which steps 202 and 204 described in this embodiment are performed should not be construed as a limitation to the specific implementation of the present disclosure. In addition, it should be understood that in the situation where step 204 may be performed in synchronization with step 202, the following step 205 may also be performed in synchronization with the above step 203, or may be performed before or after the above step 203. In the situation where step 204 may be performed before step 202 is performed, the following step 205 may also be performed before or after step 203 is performed, or may be performed in synchronization with step 203. In the situation where step 204 may be performed after step 202 is performed, the following step 205 may also be performed before or after step 203 is performed, or may be performed in synchronization with step 203. That is, the specific order in which steps 203 and 205 are performed is not limited in embodiments of the present disclosure, provided that step 203 is performed after step 202 and step 205 is performed after step 204.

In step 205, the server-side developing module generates the smart contract server-side interface and the smart contract server-side skeleton based on the specification of the target smart contract interface.

In this embodiment, the server-side developing module may generate the smart contract server-side interface and the smart contract server-side skeleton based on the specification of the target smart contract interface. Here, the smart contract server-side interface may be the server-side definition information used to define the target smart contract interface. Particularly, the server-side definition information may include information defining the target smart contract interface using a program language supported by a server side. The smart contract server-side skeleton may be used to establish a relation between the smart contract client-side interface and the smart contract server-side interface, and particularly, may be used to provide routing and adaptation from a smart contract request sent by the smart contract client-side interface to the smart contract server-side interface. The smart contract server-side interface and the smart contract server-side skeleton are used to build the server-side smart contract.

In practice, the smart contract server-side interface and the smart contract server-side skeleton may be generated in various ways. Particularly, as an example, the server-side developing module may generate the smart contract server-side interface and the smart contract server-side skeleton using a predetermined smart contract server-side framework. Here, the smart contract server-side framework may be a predetermined framework, which may include basic functions for the server side to access the smart contract based on the interface. Particularly, the server-side developing module may convert, based on the smart contract server-side framework, the specification of the target smart contract interface into a language supported by the server side, thereby generating the smart contract server-side interface. On this basis, the server-side developing module may combine functions for implementing the routing and adaptation from the smart contract client-side interface to the smart contract server-side interface in the smart contract server-side framework, to obtain the smart contract server-side skeleton.

In some alternative implementations of this embodiment, the server-side definition information may further include information used to characterize an association relationship between the target smart contract interface and the target blockchain. In practice, the developer may encapsulate the serial number of the block, to which the transaction corresponding to the target smart contract interface (i.e., the transaction produced through the target smart contract interface) belongs, in the target blockchain and the transaction confirmation time, etc. of the transaction into the smart contract server-side interface, and thus, the server-side definition information including the information used to characterize the association relationship between the target smart contract interface and the target blockchain is obtained.

In this implementation, the blockchain-related information of the target smart contract interface is extended in the smart contract server-side interface, which is conducive to developing a more comprehensive server-side smart contract. In addition, in the process of generating the smart contract server-side interface, the blockchain-related information is encapsulated, and thus, the subsequent process of developing the server-side smart contract based on the smart contract server-side interface can be simplified, thereby improving the efficiency of the development for the server-side smart contract.

In practice, the developer may build the server-side smart contract based on the generated smart contract server-side interface and the generated smart contract server-side skeleton.

In some alternative implementations of this embodiment, the above system for developing a smart contract may further include a testing module (not shown), configured to test the built client-side smart contract application and the built server-side smart contract using a target test case. Here, the target test case may be generated based on the smart contract client-side interface and the smart contract client-side agent. Particularly, the developer may use an existing software development tool, to determine the target test case based on the smart contract client-side interface and the smart contract client-side agent.

In practice, one target test case is equivalent to one smart contract request. Through the target test case, it is possible to cause the client-side smart contract application to request a smart contract from the server-side smart contract. Then, the states of the client-side smart contract application and the server-side smart contract can be determined based on the information fed back by the server-side smart contract, so as to implement a functional test for the client-side smart contract application and the server-side smart contract.

Figure 3:
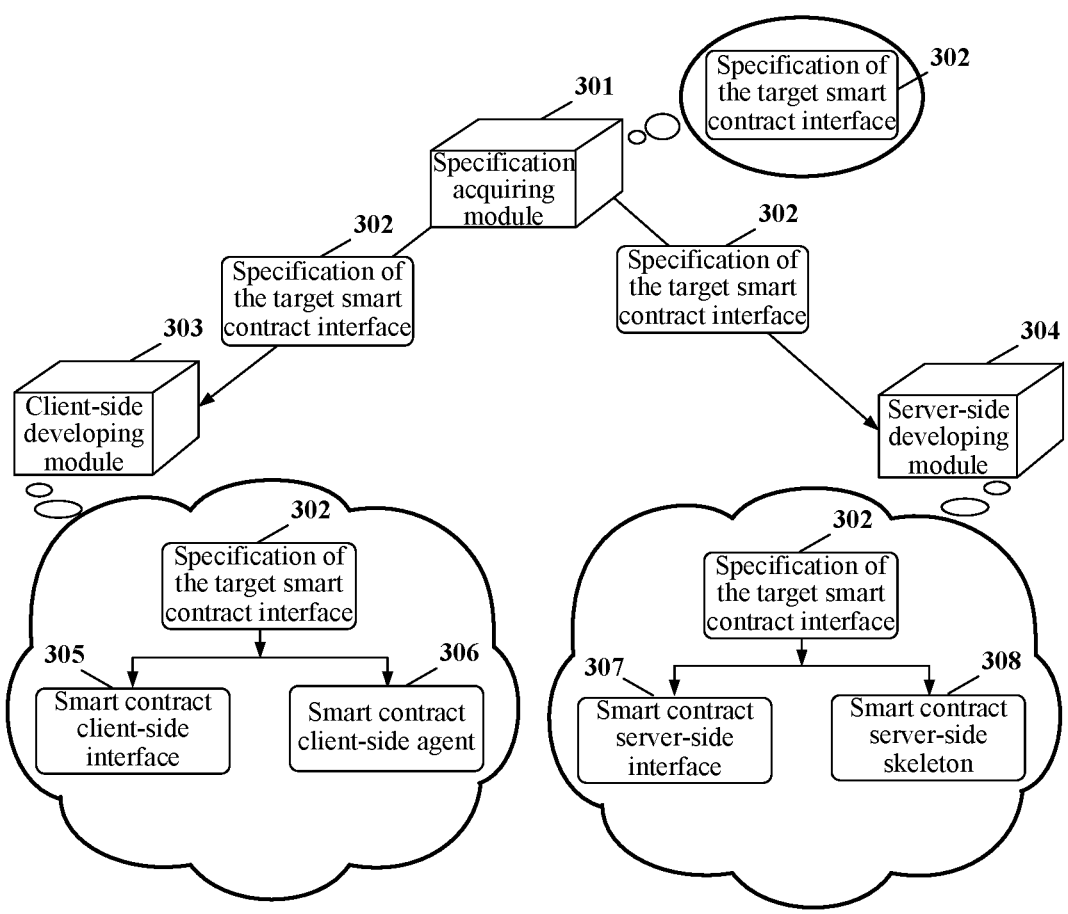
FIG. 3 is a schematic diagram of an application scenario of the system for developing a smart contract according to an embodiment of the present disclosure.

Further referring to FIG. 3, FIG. 3 is a schematic diagram of an application scenario of the system for developing a smart contract according to this embodiment.

In the application scenario of FIG. 3, a specification acquiring module 301 may first acquire specification of a target smart contract interface 302. Here, the specification of the target smart contract interface 302 is used to define a target smart contract interface. Then, the specification acquiring module 301 may send the specification of the target smart contract interface 302 to a client-side developing module 303 and a server-side developing module 304, respectively.

Next, the client-side developing module 303 may generate a smart contract client-side interface 305 and a smart contract client-side agent 306 based on the received specification of the target smart contract interface 302. Here, the smart contract client-side interface 305 is client-side definition information used to define the target smart contract interface, the smart contract client-side agent 306 is used to implement the smart contract client-side interface, and the smart contract client-side interface 305 and the smart contract client-side agent 306 are used to build a client-side smart contract application.

Moreover, the server-side developing module 304 may generate a smart contract server-side interface 307 and a smart contract server-side skeleton 308 based on the received specification of the target smart contract interface 302. Here, the smart contract server-side interface 307 is server-side definition information used to define the target smart contract interface, and the smart contract server-side skeleton is used to establish a relation between the smart contract client-side interface and the smart contract server-side interface. The smart contract server-side interface 307 and the smart contract server-side skeleton 308 are used to build a server-side smart contract.

According to the method provided in the above embodiment of the present disclosure, the development for the interface-oriented smart contract may be implemented based on the smart contract client-side interface and the smart contract server-side interface, which is conducive to simplifying the process of developing the smart contract, thus obtaining an easy-to-maintain smart contract. Moreover, the client-side smart contract application and the server-side smart contract may be respectively developed based on the specification of the smart contract interface, which further simplifies the process of developing the smart contract, thus improving the efficiency of the development for the smart contract.

Figure 4:
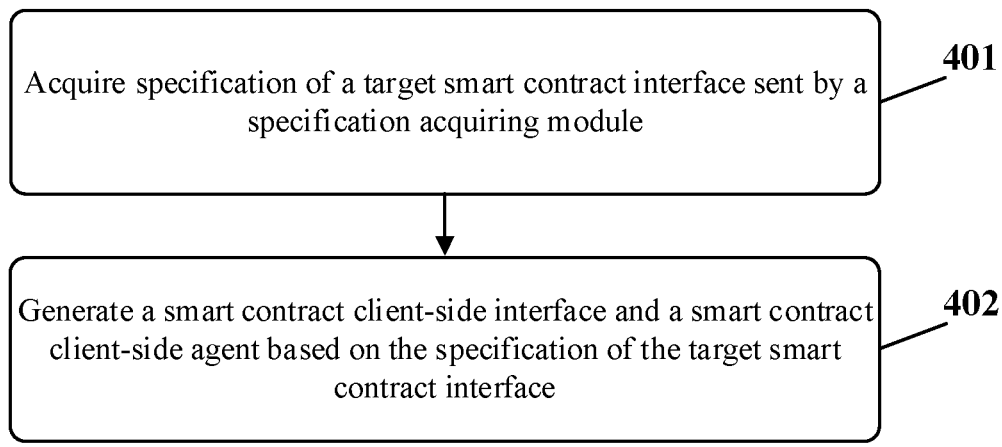
FIG. 4 is a flowchart of a method for developing a client-side smart contract application according to an embodiment of the present disclosure.

Further referring to FIG. 4, FIG. 4 illustrates a flow 400 of a method for developing a client-side smart contract application according to an embodiment of the present disclosure. The method for developing a client-side smart contract application includes the following steps.

Step 401, acquiring specification of the target smart contract interface sent by a specification acquiring module.

In this embodiment, an executing body (e.g., the client-side developing module 103 shown in FIG. 1) of the method for developing a client-side smart contract application may acquire, by means of a wired connection or a wireless connection, the specification of the target smart contract interface sent by the specification acquiring module (e.g., the specification acquiring module 101 shown in FIG. 1). Here, the specification of the target smart contract interface is used to define a target smart contract interface. The target smart contract interface may be an interface of a to-be-developed smart contract, the interface being used to implement interaction between the to-be-developed smart contract and a node in a target blockchain. The target blockchain may be a blockchain to which the to-be-developed smart contract belongs.

Step 402, generating a smart contract client-side interface and a smart contract client-side agent based on the specification of the target smart contract interface.

In this embodiment, based on the specification of the target smart contract interface obtained in step 401, the above executing body may generate the smart contract client-side interface and the smart contract client-side agent. Here, the smart contract client-side interface may be client-side definition information used to define the target smart contract interface. Particularly, the client-side definition information may include information defining the target smart contract interface using a program language supported by a client side. The smart contract client-side agent may be used to implement the smart contract client-side interface. The smart contract client-side interface and the smart contract client-side agent may be used to build a client-side smart contract application.

In some alternative implementations of this embodiment, the client-side definition information may further include information used to characterize an association relationship between the target smart contract interface and the target blockchain.

In practice, a developer may build a client-side smart contract application based on the generated smart contract client-side interface and the generated smart contract client-side agent.

It should be noted that the executing body in the embodiment corresponding to FIG. 4 may have the same features as the client-side developing module in the above system for developing a smart contract. Therefore, the embodiment corresponding to FIG. 4 may be combined with the features of the client-side developing module in the above system for developing a smart contract, to form a new technical solution. To avoid repetition, details will not be repeatedly described here.

According to the method for developing a client-side smart contract application provided in the embodiment of the present disclosure, the specification of the target smart contract interface is acquired. Here, the specification of the target smart contract interface is used to define the target smart contract interface. Then, the smart contract client-side interface and the smart contract client-side agent are generated based on the specification of the target smart contract interface. Here, the smart contract client-side interface is the client-side definition information used to define the target smart contract interface. The smart contract client-side agent is used to implement the smart contract client-side interface. The smart contract client-side interface and the smart contract client-side agent are used to build the client-side smart contract application. Accordingly, the development for the interface-oriented client-side smart contract application may be implemented based on the smart contract client-side interface, which is conducive to simplifying the process of developing the client-side smart contract application, thus obtaining an easy-to-maintain client-side smart contract application.

Figure 5:
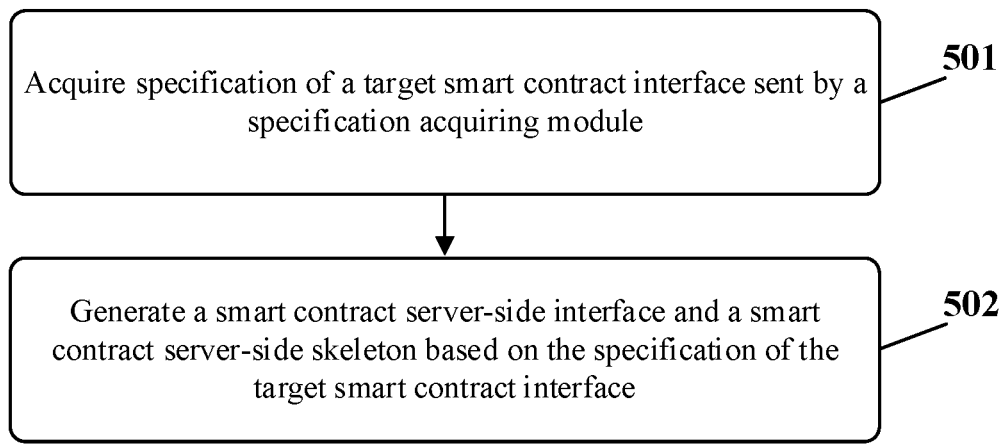
FIG. 5 is a flowchart of a method for developing a server-side smart contract according to an embodiment of the present disclosure.

Further referring to FIG. 5, FIG. 5 illustrates a flow 500 of an embodiment of a method for developing a server-side smart contract. The flow 500 of the method for developing a server-side smart contract includes the following steps.

Step 501, acquiring specification of the target smart contract interface sent by a specification acquiring module.

In this embodiment, an executing body (e.g., the server-side developing module 104 shown in FIG. 1) of the method for developing a server-side smart contract may acquire, by means of a wired connection or a wireless connection, the specification of the target smart contract interface sent by the specification acquiring module. Here, the specification of the target smart contract interface is used to define a target smart contract interface. The target smart contract interface may be an interface of a to-be-developed smart contract, used to implement an interaction between the to-be-developed smart contract and a node in a target blockchain. The target blockchain may be a blockchain to which the to-be-developed smart contract belongs.

Step 502, generating a smart contract server-side interface and a smart contract server-side skeleton based on the specification of the target smart contract interface.

In this embodiment, based on the specification of the target smart contract interface obtained in step 501, the above executing body may generate the smart contract server-side interface and the smart contract server-side skeleton. Here, the smart contract server-side interface may be server-side definition information used to define the target smart contract interface. Particularly, the server-side definition information may include information defining the target smart contract interface using a program language supported by a server side. The smart contract server-side skeleton may be used to establish a relation between a smart contract client-side interface and the smart contract server-side interface, and particularly, may be used to provide routing and adaptation from a smart contract request sent by the smart contract client-side interface to the smart contract server-side interface. The smart contract server-side interface and the smart contract server-side skeleton may be used to build a server-side smart contract.

In some alternative implementations of this embodiment, the server-side definition information may further include information used to characterize an association relationship between the target smart contract interface and the target blockchain.

In practice, a developer may build the server-side smart contract based on the generated smart contract server-side interface and the generated smart contract server-side skeleton.

It should be noted that the executing body in the embodiment corresponding to FIG. 5 may have the same features as the server-side developing module in the above system for developing a smart contract. Therefore, the embodiment corresponding to FIG. 5 may be combined with the features of the server-side developing module in the above system for developing a smart contract, to form a new technical solution. To avoid repetition, details will not be repeatedly described here.

According to the method for developing a server-side smart contract provided in the embodiment of the present disclosure, the specification of the target smart contract interface is acquired. Here, the specification of the target smart contract interface is used to define the target smart contract interface. Then, the smart contract server-side interface and the smart contract server-side skeleton are generated based on the specification of the target smart contract interface. Here, the smart contract server-side interface is the server-side definition information used to define the target smart contract interface. The smart contract server-side skeleton is used to establish the relation between the smart contract client-side interface and the smart contract server-side interface. The smart contract server-side interface and the smart contract server-side skeleton are used to build the server-side smart contract. Accordingly, the development for the interface-oriented server-side smart contract may be implemented based on the smart contract server-side interface, which is conducive to simplifying the process of developing the server-side smart contract, thus obtaining an easy-to-maintain server-side smart contract.

Figure 6:
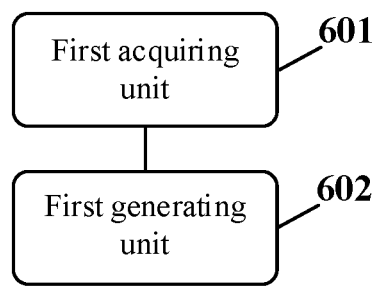
FIG. 6 is a schematic structural diagram of an apparatus for developing a client-side smart contract application according to an embodiment of the present disclosure.

Further referring to FIG. 6, as an implementation of the method shown in the above drawings, an embodiment of the present disclosure provides an apparatus for developing a client-side smart contract application. The embodiment of the apparatus corresponds to the embodiment of the method shown in FIG. 4. The apparatus may be applied in various electronic devices.

As shown in FIG. 6, the apparatus 600 for developing a client-side smart contract application in this embodiment includes: a first acquiring unit 601 and a first generating unit 602. Here, the first acquiring unit 601 is configured to acquire specification of the target smart contract interface sent by a specification acquiring module. Here, the specification of the target smart contract interface is used to define the target smart contract interface. The first generating unit 602 is configured to generate a smart contract client-side interface and a smart contract client-side agent based on the specification of the target smart contract interface. Here, the smart contract client-side interface is client-side definition information used to define the target smart contract interface, the smart contract client-side agent is used to implement the smart contract client-side interface, and the smart contract client-side interface and the smart contract client-side agent are used to build a client-side smart contract application.

In this embodiment, the first acquiring unit 601 may acquire, by means of a wired connection or a wireless connection, the specification of the target smart contract interface sent by the specification acquiring module (e.g., the specification acquiring module 101 shown in FIG. 1). Here, the specification of the target smart contract interface is used to define the target smart contract interface. The target smart contract interface may be an interface of a to-be-developed smart contract, the interface being used to implement interaction between the to-be-developed smart contract and a node in a target blockchain. The target blockchain may be a blockchain to which the to-be-developed smart contract belongs.

In this embodiment, based on the specification of the target smart contract interface obtained by the first acquiring unit 601, the first generating unit 602 may generate the smart contract client-side interface and the smart contract client-side agent. Here, the smart contract client-side interface may be the client-side definition information used to define the target smart contract interface. Particularly, the client-side definition information may include information defining the target smart contract interface using a program language supported by a client side. The smart contract client-side agent may be used to implement the smart contract client-side interface. The smart contract client-side interface and the smart contract client-side agent may be used to build the client-side smart contract application.

In practice, a developer may build the client-side smart contract application based on the generated smart contract client-side interface and the generated smart contract client-side agent.

In some alternative implementations of this embodiment, the client-side definition information may further include information used to represent an association relationship between the target smart contract interface and the target blockchain.

It may be understood that the units recorded in the apparatus 600 correspond to the steps in the method described with reference to FIG. 4. Therefore, the above operations and features described for the method and the produced beneficial effects are also applicable to the apparatus 600 and the units contained therein, and thus will not be repeatedly described here.

According to the apparatus 600 provided in the above embodiment of the present disclosure, the development for the interface-oriented client-side smart contract application may be implemented based on the smart contract client-side interface, which is conducive to simplifying the process of developing the client-side smart contract application, thus obtaining an easy-to-maintain client-side smart contract application.

Figure 7:
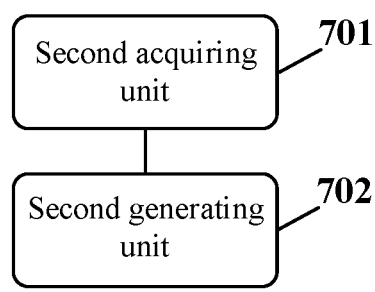
FIG. 7 is a schematic structural diagram of an apparatus for developing a server-side smart contract according to an embodiment of the present disclosure.

Further referring to FIG. 7, as an implementation of the method shown in the above drawings, an embodiment of the present disclosure provides an apparatus for developing a server-side smart contract. The embodiment of the apparatus corresponds to the embodiment of the method shown in FIG. 5. The apparatus may be applied in various electronic devices.

As shown in FIG. 7, the apparatus 700 for developing a server-side smart contract in this embodiment includes: a second acquiring unit 701 and a second generating unit 702. Here, the second acquiring unit 701 is configured to acquire specification of a target smart contract interface sent by a specification acquiring module. Here, the specification of the target smart contract interface is used to define the target smart contract interface. The second generating unit 702 is configured to generate a smart contract server-side interface and a smart contract server-side skeleton based on the specification of the target smart contract interface. Here, the smart contract server-side interface is server-side definition information used to define the target smart contract interface, the smart contract server-side skeleton is used to establish a relation between a smart contract client-side interface and the smart contract server-side interface, and the smart contract server-side interface and the smart contract server-side skeleton are used to build a server-side smart contract.

In this embodiment, the second acquiring unit 701 may acquire, by means of a wired connection or a wireless connection, the specification of the target smart contract interface sent by the specification acquiring module. Here, the specification of the target smart contract interface is used to define a target smart contract interface. The target smart contract interface may be an interface of a to-be-developed smart contract, the interface being used to implement an interaction between the to-be-developed smart contract and a node in a target blockchain. The target blockchain may be a blockchain to which the to-be-developed smart contract belongs.

In this embodiment, based on the specification of the target smart contract interface obtained by the second acquiring unit 701, the second generating unit 702 may generate the smart contract server-side interface and the smart contract server-side skeleton. Here, the smart contract server-side interface may be the server-side definition information used to define the target smart contract interface. Particularly, the server-side definition information may include information defining the target smart contract interface using a program language supported by a server side. The smart contract server-side skeleton may be used to establish the relation between the smart contract client-side interface and the smart contract server-side interface, and particularly, may be used to provide routing and adaptation from a smart contract request sent by the smart contract client-side interface to the smart contract server-side interface. The smart contract server-side interface and the smart contract server-side skeleton may be used to build the server-side smart contract.

In practice, a developer may build the server-side smart contract based on the generated smart contract server-side interface and the generated smart contract server-side skeleton.

In some alternative implementations of this embodiment, the server-side definition information may further include information used to represent an association relationship between the target smart contract interface and the target blockchain.

It may be understood that the units recorded in the apparatus 700 correspond to the steps in the method described with reference to FIG. 5. Therefore, the above operations and features described for the method and the produced beneficial effects are also applicable to the apparatus 700 and the units contained therein, and thus will not be repeatedly described here.

According to the apparatus 700 provided in the above embodiment of the present disclosure, the development for the interface-oriented server-side smart contract may be implemented based on the smart contract server-side interface, which is conducive to simplifying the process of developing the server-side smart contract, thus obtaining an easy-to-maintain server-side smart contract.

Figure 8:
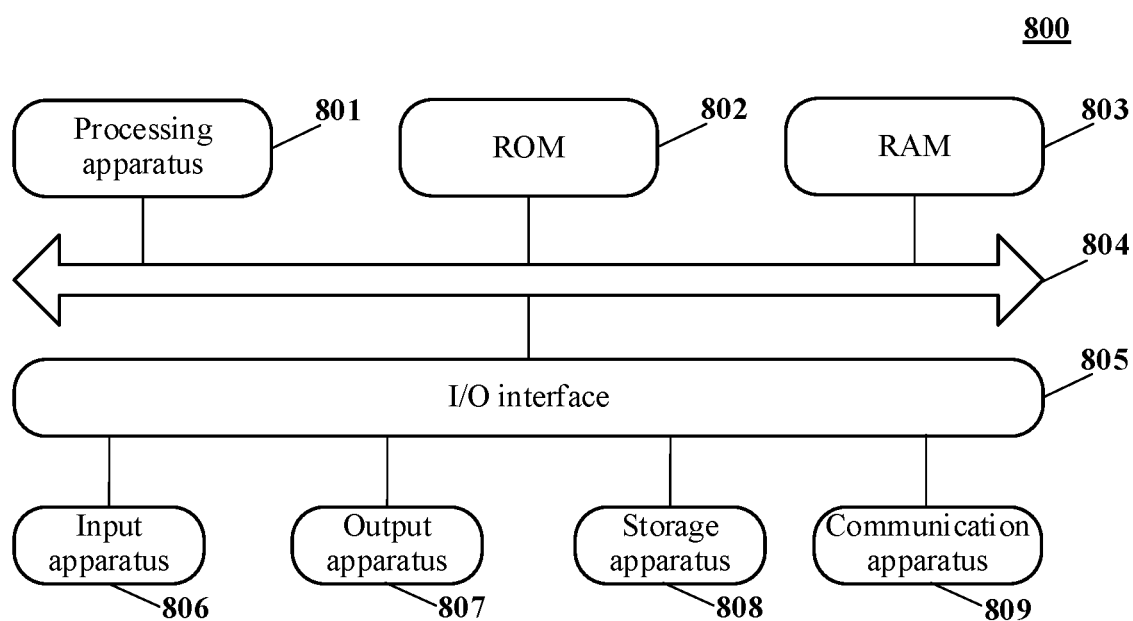
FIG. 8 is a schematic structural diagram of a computer system of an electronic device adapted to implement embodiments of the present disclosure.

Further referring to FIG. 8, FIG. 8 is a schematic structural diagram of an electronic device (e.g., the client-side developing module 103 or the server-side developing module 104 shown in FIG. 1) 800 adapted to implement embodiments of the present disclosure. The electronic device shown in FIG. 8 is merely an example, and should not bring any limitation to the functions and the scope of use of embodiments of the present disclosure.

As shown in FIG. 8, the electronic device 800 includes a processing apparatus (e.g., a central processing unit or a graphics processing unit) 801, which may execute various appropriate actions and processes in accordance with a program stored in a read-only memory (ROM) 802 or a program loaded into a random access memory (RAM) 803 from a storage apparatus 808. The RAM 803 further stores various programs and data required by operations of the electronic device 800. The processing apparatus 801, the ROM 802 and the RAM 803 are connected to each other through a bus 804. An input/output (I/O) interface 805 is also connected to the bus 804.

Generally, the following components are connected to the I/O interface 805: an input apparatus 806, such as a keyboard, a mouse, a camera, a microphone, an accelerometer, a gyroscope; an output apparatus 807, such as Liquid Crystal Displays (LCDs), a speaker, a vibrator; a storage apparatus 808, such as a magnetic disk and an optical disk; and a communication apparatus 809. The communication apparatus 809 allows the device 800 to exchange information or data with other devices through a wired or wireless communication. While FIG. 8 shows an electronic device 800 having various components, it should be understood that not all of the illustrated components are required to be implemented or provided. More or fewer components may alternatively be implemented or provided.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 809, or may be installed from the storage portion 808, or may be installed from the ROM 802. The computer program, when executed by the central processing unit (CPU) 801, implements the above mentioned functionalities as defined by the methods of the present disclosure.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The above computer readable medium may be the computer readable medium included in the above electronic device, or a stand-alone computer readable medium not assembled into the electronic device. The above computer readable medium carries one or more programs. The one or more programs, when executed by the electronic device, cause the electronic device to: acquire specification of a target smart contract interface sent by a specification acquiring module, the specification of the target smart contract interface being used to define the target smart contract interface; and generate a smart contract client-side interface and a smart contract client-side agent based on the specification of the target smart contract interface, where the smart contract client-side interface is client-side definition information used to define the target smart contract interface, the smart contract client-side agent is used to implement the smart contract client-side interface, and the smart contract client-side interface and the smart contract client-side agent are used to build a client-side smart contract application.

Alternatively, the one or more programs, when executed by the electronic device, cause the electronic device to:

acquire specification of a target smart contract interface sent by a specification acquiring module, the specification of the target smart contract interface being used to define a target smart contract interface; and generate a smart contract server-side interface and a smart contract server-side skeleton based on the specification of the target smart contract interface, where the smart contract server-side interface is server-side definition information used to define the target smart contract interface, the smart contract server-side skeleton is used to establish a relation between a smart contract client-side interface and the smart contract server-side interface, and the smart contract server-side interface and the smart contract server-side skeleton are used to build a server-side smart contract.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The involved units described in embodiments of the present disclosure may be implemented by means of software or hardware. Here, the names of these units do not in some cases constitute a limitation to such units themselves. For example, the first acquiring unit may alternatively be described as "a unit for acquiring specification of a target smart contract interface."

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A system for developing a smart contract, comprising:
    a specification acquiring module, configured to acquire specification of a target smart contract interface, the specification of the target smart contract interface being used to define the target smart contract interface;
    a client-side developing module, configured to generate a smart contract client-side interface and a smart contract client-side agent according to the specification of the target smart contract interface, wherein the smart contract client-side interface is client-side definition information used to define the target smart contract interface, the smart contract client-side agent is used to implement the smart contract client-side interface, and the smart contract client-side interface and the smart contract client-side agent are used to build a client-side smart contract application; and
    a server-side developing module, configured to generate a smart contract server-side interface and a smart contract server-side skeleton according to the specification of the target smart contract interface, wherein the smart contract server-side interface is server-side definition information used to define the target smart contract interface, the smart contract server-side skeleton is used to establish a relation between the smart contract client-side interface and the smart contract server-side interface, and the smart contract server-side interface and the smart contract server-side skeleton are used to build a server-side smart contract.

2. The system according to claim 1, wherein the specification acquiring module is further configured to:
    acquire the specification of the target smart contract interface of the target smart contract interface using a predetermined smart contract interface specification template.

3. The system according to claim 1, wherein the client-side definition information and the server-side definition information comprise information used to characterize an association relationship between the target smart contract interface and a target blockchain.

4. The system according to claim 1, further comprising:
    a testing module, configured to test the built client-side smart contract application and the built server-side smart contract using a target test case, the target test case being generated based on the smart contract client-side interface and the smart contract client-side agent.

5. A method for developing a client-side smart contract application, comprising:
    acquiring specification of a target smart contract interface sent from a specification acquiring module, the specification of the target smart contract interface being used to define the target smart contract interface; and
    generating a smart contract client-side interface and a smart contract client-side agent according to the specification of the target smart contract interface, wherein the smart contract client-side interface is client-side definition information used to define the target smart contract interface, the smart contract client-side agent is used to implement the smart contract client-side interface, and the smart contract client-side interface and the smart contract client-side agent are used to build a client-side smart contract application.

6. The method according to claim 5, wherein the client-side definition information comprises information used to characterize an association relationship between the target smart contract interface and a target blockchain.

7. A method for developing a server-side smart contract, comprising:
acquiring specification of a target smart contract interface sent from a specification acquiring module, the specification of the target smart contract interface being used to define the target smart contract interface; and
generating a smart contract server-side interface and a smart contract server-side skeleton according to the specification of the target smart contract interface, wherein the smart contract server-side interface is server-side definition information used to define the target smart contract interface, the smart contract server-side skeleton is used to establish a relation between a smart contract client-side interface and the smart contract server-side interface, and the smart contract server-side interface and the smart contract server-side skeleton are used to build a server-side smart contract.

8. The method according to claim 7, wherein the server-side definition information comprises information used to characterize an association relationship between the target smart contract interface and a target blockchain.

* * * * *